US008884632B2

(12) United States Patent
Klofer et al.

(10) Patent No.: US 8,884,632 B2
(45) Date of Patent: Nov. 11, 2014

(54) FILL LEVEL MEASURING DEVICE WORKING WITH MICROWAVES

(75) Inventors: Peter Klofer, Steinen (DE); Winfried Mayer, Buch (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 797 days.

(21) Appl. No.: 13/122,749

(22) PCT Filed: Aug. 12, 2009

(86) PCT No.: PCT/EP2009/060404
§ 371 (c)(1),
(2), (4) Date: Apr. 6, 2011

(87) PCT Pub. No.: WO2010/040580
PCT Pub. Date: Apr. 15, 2010

(65) Prior Publication Data
US 2011/0193567 A1 Aug. 11, 2011

(30) Foreign Application Priority Data
Oct. 10, 2008 (DE) .......................... 10 2008 050 329

(51) Int. Cl.
*G01R 27/32* (2006.01)
*G01F 23/284* (2006.01)

(52) U.S. Cl.
CPC .................................... *G01F 23/284* (2013.01)
USPC ......... 324/642; 324/76.56; 324/629; 324/637

(58) Field of Classification Search
CPC ... G01F 23/284; G01F 23/2962; G01F 23/00; G01F 23/0061; G01F 25/0061; G01F 1/007; G01F 23/28; G01F 23/14; G01F 23/263; G01F 23/296; G01F 23/2967; G01S 7/285; G01S 7/282; G01S 7/487; G01S 7/527; G01S 13/106; H01Q 1/225; G01D 11/24; G01D 21/02; G01D 5/54
USPC ............................... 324/629, 637, 642, 76.56
See application file for complete search history.

(56) References Cited

U.S. PATENT DOCUMENTS 5,420,591 A * 5/1995 Annee et al. ................... 342/188
5,504,490 A * 4/1996 Brendle et al. ................ 342/118
(Continued)

FOREIGN PATENT DOCUMENTS

DE      100 40 131 A1     3/2002
DE      10360711 A1 *     7/2005
(Continued)

OTHER PUBLICATIONS

English translation of the International Preliminary Report, Apr. 12, 2011.
(Continued)

*Primary Examiner* — Jermele M Hollington
*Assistant Examiner* — Sean Curtis
(74) *Attorney, Agent, or Firm* — Bacon & Thomas, PLLC

(57) ABSTRACT

A fill level measuring device. On a plurality of different signal paths, microwave signals can be transmitted into a container, and their associated echo signals recorded. The device includes: measuring device electronics having a microwave generator for the successive production of microwave signals; and, connected thereto, a frequency-selective, passive antenna arrangement, which has a number of frequency-selective elements—especially bandpass filters—in each case transmissive for one of the different wanted frequencies. Via the antennas and the frequency-selective elements, for each of the different microwave signals and its echo signal, a uniquely associated signal path is specified, via which a microwave signal is transmitted into the container and its echo signal, reflected back to the antenna arrangement, is received and fed to the measuring device electronics. The device also includes an apparatus, which is provided in the measuring device electronics and which associates successively arriving echo signals with the associated signal path.

10 Claims, 5 Drawing Sheets

(56) References Cited

U.S. PATENT DOCUMENTS

| | | | |
|---|---|---|---|
| 6,415,660 B1* | 7/2002 | Sinz et al. | 73/290 R |
| 6,581,460 B1* | 6/2003 | Laun | 73/290 V |
| 6,677,891 B2* | 1/2004 | Fehrenbach et al. | 342/124 |
| 6,684,919 B2* | 2/2004 | Gaiser | 141/95 |
| 6,806,824 B2* | 10/2004 | Kornle et al. | 342/118 |
| 6,911,929 B2* | 6/2005 | Laun | 341/155 |
| 6,928,866 B2* | 8/2005 | Michalski et al. | 73/290 R |
| 7,224,944 B2* | 5/2007 | McEwan | 455/86 |
| 7,408,501 B2* | 8/2008 | Rolfes et al. | 342/124 |
| 7,639,177 B2* | 12/2009 | Welle et al. | 342/124 |
| 7,826,309 B2* | 11/2010 | Spanke et al. | 367/99 |
| 8,567,251 B2* | 10/2013 | Welle et al. | 73/602 |
| 2002/0020216 A1 | 2/2002 | Schultheiss | |
| 2002/0059828 A1 | 5/2002 | Muller | |
| 2002/0112774 A1* | 8/2002 | Gaiser | 141/1 |
| 2002/0154052 A1* | 10/2002 | Fehrenbach et al. | 342/124 |
| 2003/0146867 A1* | 8/2003 | Kornle et al. | 342/124 |
| 2003/0167839 A1* | 9/2003 | Burger et al. | 73/290 V |
| 2004/0056667 A1* | 3/2004 | Lutke et al. | 324/644 |
| 2004/0074295 A1* | 4/2004 | Michalski et al. | 73/290 R |
| 2004/0183550 A1* | 9/2004 | Fehrenbach et al. | 324/662 |
| 2005/0164643 A1* | 7/2005 | McEwan | 455/67.15 |
| 2005/0264441 A1* | 12/2005 | Abrahamsson | 342/124 |
| 2006/0169040 A1* | 8/2006 | Spanke | 73/290 V |
| 2007/0101809 A1* | 5/2007 | Roesner | 73/290 R |
| 2007/0186678 A1* | 8/2007 | Griessbaum et al. | 73/861 |
| 2008/0129583 A1* | 6/2008 | Larsson et al. | 342/124 |
| 2008/0143583 A1* | 6/2008 | Welle et al. | 342/124 |
| 2008/0302439 A1* | 12/2008 | Spanke et al. | 141/1 |
| 2010/0307251 A1* | 12/2010 | Welle et al. | 73/627 |

FOREIGN PATENT DOCUMENTS

| | | |
|---|---|---|
| DE | 10 2005 011 686 A1 | 9/2006 |
| EP | 1 431 724 A1 | 6/2004 |
| EP | 1431724 A1 * | 6/2004 |

OTHER PUBLICATIONS

German Search Report, May 7, 2009.
International Search Report, Apr. 12, 2009.

* cited by examiner

FILL LEVEL MEASURING DEVICE WORKING WITH MICROWAVES

TECHNICAL FIELD

The invention relates to a fill level measuring device working according to the travel time principle for fill level measurement of fill substances located in containers, with which device microwave signals are transmitted on different signal paths into the container, whose associated echo signals, reflected off the surface of the fill substance, are received back after a travel time dependent on fill level, and, based on their travel times, fill levels are determined.

BACKGROUND DISCUSSION

Such contactlessly working measuring devices are applied in a large number of branches of industry, e.g. in the processing industry, in the chemistry industry and in the foods industry.

Typically, the fill level measuring device is mounted above the fill substance, and its antenna is pointed toward the fill substance.

For determining travel times, all known methods can be applied which enable relatively short distances to be measured by means of reflected microwaves. The best-known examples are pulse radar and frequency-modulated continuous wave radar (FMCW radar).

In the case of pulse radar, short microwave pulses are periodically transmitted, which are reflected by the surface of the fill substance and received back after a distance-dependent travel time. Based on the received signal, an echo function is derived, which shows received signal amplitude as a function of time. Each value of this echo function corresponds to the amplitude of an echo reflected at a particular distance from the antenna.

In the case of the FMCW method, a microwave signal is continuously transmitted, which is periodically linearly frequency modulated, for example, according to a sawtooth function. The frequency of the received echo signal has, consequently, in comparison to the instantaneous frequency which the transmission signal has for the point in time of receipt, a frequency difference, which depends on the travel time of the microwave signal and its echo signal. The frequency difference between the transmission signal and received signal, which can be gained by mixing of both signals and evaluation of the Fourier spectrum of the mixed signal, thus corresponds to the distance of the reflecting area from the antenna. Additionally, the amplitudes of the spectral lines of the frequency spectrum gained by the Fourier transformation correspond to the echo amplitudes. This Fourier spectrum, consequently, in this case represents the echo function.

From the echo function, at least one wanted echo is determined, which corresponds to the reflection of the transmission signal off the surface of the fill substance. In the case of known propagation velocity for the microwaves, from the travel time of the wanted echo, there is directly yielded the distance which the microwaves travel on their way from the measuring device to the surface of the fill substance and back. On the basis of the installed height of the fill level measuring device over the container, the sought fill level can be directly calculated.

There are, however, a large number of applications, in the case of which this form of fill level measurement is insufficient.

An example of this is presented by fill level measurements in storage containers for bulk goods. Bulk goods form, as a rule, a bulk goods cone. The above-named classical fill level measurement delivers here the fill level in a particular region of the bulk goods cone predetermined by the antenna position and its orientation; however, a more exact determining of the fill substance volume is not achievable thereby. In these cases, so-called multipoint measurements are regularly performed today. In such case, a number of fill level measuring devices are arranged next to one another over the fill substance, and the fill levels in the individual regions in the container registered by the respective measuring devices are determined. The use of a number of fill level measuring devices is, as a rule, quite expensive and complicated. Alternatively, for this purpose, a fill level measuring device can be equipped with a plurality of antennas arranged at different locations over the fill substance, and, for example, these antennas are switched in individually via electronic switches arranged in the field. The use of a plurality of antennas which can be switched in via electronic switches is, in contrast to the above, indeed cost effective; it has, however, the disadvantage, that these switches, arranged, as a rule, directly on the antenna in the field, must be supplied with energy. This is not only complicated, but also represents a safety risk, especially in applications in which, for reasons of explosion protection, special safety precautions must be followed.

Further examples are applications in the case of which there are present in the container disturbances, e.g. stirring mechanisms or other installed objects, off of which the transmitted microwave signals are likewise reflected. In this case, the echo signal recorded with the fill level measuring device contains both the wanted echo to be traced back to a reflection off the surface of the fill substance, as well as also disturbing echoes to be traced back to reflections off the disturbances. Accordingly, it is very difficult—or, under certain circumstances, even impossible—to ascertain based on the echo signal the wanted echo sought, and therewith the fill level to be measured. For overcoming this problem, so-called multi-lobe measurements are frequently performed. In such case, the microwave signals are transmitted into the container in a plurality of transmission lobes with different orientations. The transmission lobes are, in such case, oriented, for example, in such a manner, that each transmission lobe reaches the fill substance. The echo signals of the individual transmission lobes are recorded, and, based on the known orientation of the different transmission lobes, additional information is gained, on the basis of which the wanted echo contained in all echo signals can be determined much more exactly and reliably. Examples for this are described in EP 1 431 724 A1. Described, among other things, is how to ascertain the wanted echo based on the amplitudes of the individual echo signals. While the amplitude of the wanted echo is, angle corrected, the same in all echo signals, the disturbing echoes in the different echo signals have different amplitudes due to the different orientations of the associated transmission lobes.

Both in the case of multipoint measurement, as well as in the case of multilobe measurement, it is necessary to transmit microwave signals into the container on different signal paths, and to evaluate their echo signals separately from one another.

For this, a number of parallelly operated transmitting and/or receiver arrangements and/or electronic switches can be applied. In DE 10 2004 034 429 there is described an example for this, which is applied in the automobile industry as a distance sensor. There, a microwave generator is successively connected via a switch to different transmission antennas, and to each of the receiving antennas is connected a separate receiving branch, via which the echo signal taken up by the respective receiving antenna is taken up and fed to a signal processing system. The associating of the individual measuring signals to the individual signal paths occurs here via the respective switch positions and the separate receiving branches.

SUMMARY OF THE INVENTION

An object of the invention is to provide a fill level measuring device working with microwaves according to the travel time principle, with which microwave signals can be transmitted on a number of different signal paths into the container, and their associated echo signals recorded, and the measurement results gained on the different signal paths can be evaluated separately from one another.

For this, the invention resides in a fill level measuring device working with microwaves according to the travel time principle for fill level measurement of fill substances located in containers, having
- measuring device electronics with a microwave generator for successive production of microwave signals having different wanted frequencies, and
- a frequency-selective passive antenna arrangement connected thereto,
  - which has a number of antennas, which serve to transmit the different microwave signals successively into the container, and to receive their echo signals reflected back to the antenna arrangement,
  - which has a number of frequency-selective elements, especially bandpass filters, in each case transmissive for one of the different wanted frequencies, and
  - in which, via the antennas and the frequency-selective elements, for each of the different microwave signals and its echo signal, a uniquely associated signal path is specified, via which a microwave signal is transmitted into the container, and its echo signal, reflected back to the antenna arrangement, is received and fed to the measuring device electronics, and
- an apparatus, which is provided in the measuring device electronics and which associates successively arriving echo signals with the associated signal path.

In a first variant, the invention resides in a fill level measuring device, in the case of which
- one of the antennas is a transmitting antenna, which serves to transmit the different microwave signals into the container,
- the remaining antennas are receiving antennas, which serve to receive the echo signals of the different microwave signals reflected back to the antenna arrangement by reflections in the container,
- in the antenna arrangement, after each receiving antenna there is connected a frequency-selective element, especially a bandpass filter, transmissive for one of the different wanted frequencies, this element serving to filter out from the received signal taken up by the particular receiving antenna the echo signal having such wanted frequency, and
- the apparatus associates the echo signals successively transmitted from the antenna arrangement to the measuring device electronics with the receiving antennas, from which they were received.

In a second variant, the invention resides in a fill level measuring device, in the case of which
- one of the antennas is a receiving antenna, which serves to receive the echo signals of the different microwave signals reflected back to the antenna arrangement by reflections in the container,
- the remaining antennas are transmission antennas, which serve, in each case, to transmit one of the different microwave signals into the container,
- in the antenna arrangement, placed in front of each transmitting antenna, is a frequency-selective element, especially a bandpass filter, transmissive for one of the different wanted frequencies, which serves to filter out from the microwave signals produced by the microwave generator that signal, which, in the measurement operation, is transmitted via the particular transmitting antenna, and
- the apparatus associates the successive echo signals transmitted from the antenna arrangement to the measuring device electronics with the transmitting antennas, from which the associated microwave signals were transmitted.

In a third variant, the invention resides in a fill level measuring device, in the case of which
- the antennas are transmitting and receiving antennas, which serve to transmit the different microwave signals into the container and to receive their echo signals reflected back to the antenna arrangement by reflections in the container,
- in the antenna arrangement, associated with each transmitting and receiving antenna is a frequency-selective element, especially a bandpass filter, which is transmissive for one of the different wanted frequencies and which serves to filter out from the microwave signals produced by the microwave generator and conveyed to the antenna arrangement and to convey to the transmitting and receiving antenna that signal, which is transmitted via such transmitting and receiving antenna; and which serves to filter out from the received signal taken up by this transmitting and receiving antenna the associated echo signal having such wanted frequency, and
- the apparatus associates the echo signals successively transmitted from the antenna arrangement to the measuring device electronics with that transmitting and receiving antenna, via which the associated microwave signal was transmitted and its echo signal received.

In a further development of the invention, the measuring device electronics is connected with the antenna arrangement exclusively via a single waveguide,
- via which the different microwave signals are transmitted from the measuring device electronics to the antenna arrangement, and the echo signals are transmitted from the antenna arrangement to the measuring device electronics, and
- which is connected to all transmission antennas and to all receiving antennas via a transmitter/receiver separation system provided in the antenna arrangement.

In an alternative further development
- the measuring device electronics is connected with the antenna arrangement via a transmission waveguide, via which the transmission antennas are fed with the different microwave signals, and
- the measuring device electronics is connected with the antenna arrangement via a receiving wave guide, via which the echo signals are transmitted from the antenna arrangement to the measuring device electronics.

In an embodiment of the first variant,
- the receiving antennas are arranged in a group spatially neighboring one another, and
- the transmitting antenna is arranged spatially outside the group.

In an embodiment of the second variant,
the transmission antennas are arranged in a group spatially neighboring one another, and
the receiving antenna is arranged spatially outside the group.

In another embodiment of the first variant,
the receiving antennas spatially surround the transmitting antenna,
the transmitting antenna is pointed toward the fill substance in the container,
the receiving antennas have, in each case, an orientation inclined relative to the orientation of the transmitting antenna, and
receiving regions of the individual receiving antennas, as predetermined by the orientations of the receiving antennas and covered by the respective receiving antennas, partially overlap.

In another embodiment of the second variant,
the transmission antennas spatially surround the receiving antenna,
the receiving antenna is pointed toward the fill substance in the container,
the transmission antennas have, in each case, an orientation inclined relative to the orientation of the receiving antenna, and
transmission regions of the individual transmission antennas, as predetermined by the orientations of the transmission antennas, lie at least partially in the receiving region of the receiving antenna and partially overlap.

The fill level measuring devices of the invention have the advantage, that, by the arrangement of the antennas in the antenna arrangement, their integration as transmitting antenna, as receiving antenna, or as transmitting and receiving antenna and the frequency-selective elements for each of the different microwave signals and each corresponding echo signal, a unique signal path defined exclusively by passive components is uniquely predetermined. The passive components require no electrical current supply. Electronic switches or other active components needing an energy supply are accordingly no longer required. The association of the gained measurement results to the individual signal paths is therewith automatically given via the wanted frequency both of the particular microwave signal transmitted as well as the associated echo signal. The individual echo signals arrive successively in the measuring device electronics, and can there, separated from one another and with knowledge of the associated signal path, be processed and evaluated in one and the same signal processing system.

BRIEF DESCRIPTION OF THE DRAWINGS

The invention will now be explained in greater detail on the basis of the appended drawing, in which five examples of an embodiment are presented; equal parts are provided in the figures with equal reference characters. The figures of the drawing show as follows.

DETAILED DISCUSSION IN CONJUNCTION WITH THE DRAWINGS

Figure 1:
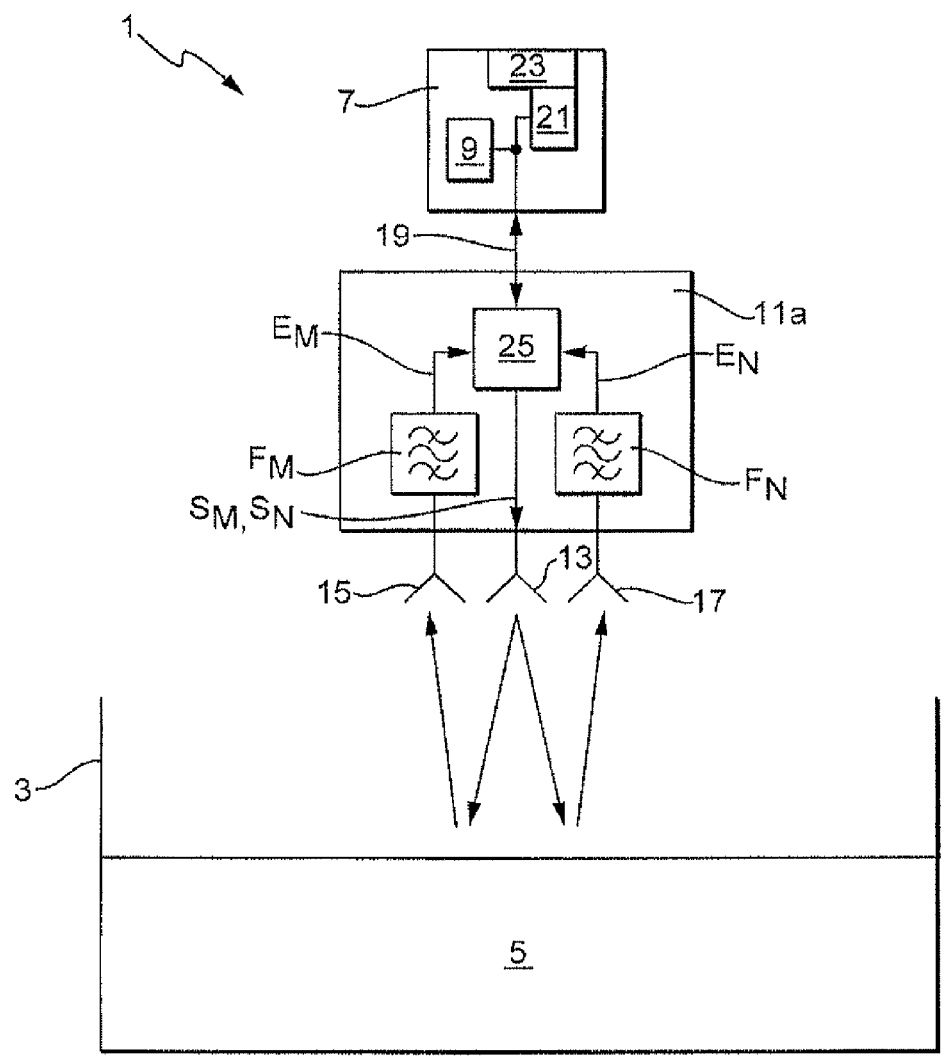
FIG. 1 is a fill level measuring device of the invention with measuring device electronics and, connected thereto via a single microwave guide, a frequency-selective antenna arrangement with a transmitting antenna and a plurality of receiving antennas.

FIG. 1 shows a sketch of the principles of a first variant of the fill level measuring device 1 of the invention. Fill level measuring device 1 is a fill level measuring device working with microwaves according to the travel time principle, e.g. an FMCW radar fill level measuring device or a pulse radar fill level measuring device, and serves for fill level measurement of fill substances 5 located in containers 3. It includes measuring device electronics 7, which includes a microwave generator 9, which serves for successive producing of microwave signals $S_M$, $S_N$ having at least two different wanted frequencies $f_m$, $f_n$. Microwave generators 9, as applicable in fill level measuring devices, are known from the state of the art. The production of the microwave signals $S_M$, $S_N$ having different wanted frequencies $f_m$, $f_n$ can be effected, for example, by a corresponding operating of digitally operable electronic tuning elements of the microwave generator 9, which are already regularly provided in modern microwave generators 9, e.g. in direct digital synthesizers (DDS) or voltage-controlled oscillators (VCO). The setting of the wanted frequency occurs then, for example, via a varactor installed in a resonance circuit of a transmission oscillator. Alternatively, a synthesizer structure in the transmission oscillator can be used, and the setting of the wanted frequency can be performed via a change in values of an adjustable frequency divider. Likewise, a direct digital synthesizer with a changeable output frequency can be applied, or the wanted frequencies can be effected via the selective adjusting of the working points of active components of a transmission oscillator.

Connected to the measuring device electronics 7, according to the invention, is a frequency-selective, passive antenna arrangement 11. The antenna arrangement 11 includes a number of antennas, which serve to transmit successively the different microwave signals $S_M$, $S_N$ into the container 3, and to receive their echo signals $E_M$, $E_N$ reflected back to the antenna arrangement 11. The antenna arrangement 11a shown in FIG. 1 includes for this a transmitting antenna 13, which serves to transmit the different microwave signals $S_M$, $S_N$ into the container 1, and a plurality of receiving antennas 15, 17, which serve to receive the echo signals $E_M$, $E_N$ of the different microwave signals $S_M$, $S_N$ reflected back to the antenna arrangement 11a.

The antenna arrangements 11 of the invention have a number of frequency-selective elements $F_M$, $F_N$, especially bandpass filters, in each case transmissive for one of the different wanted frequencies $f_m$, $f_n$. A basic principle of the invention is that, in the antenna arrangement 11, via the antennas and the frequency-selective elements $F_M$, $F_N$, for each of the different microwave signals $S_M$, $S_N$ and its echo signal $E_M$, $E_N$, a uniquely associated signal path is created, via which a microwave signal $S_M$, $S_N$ is transmitted into the container 3, and its echo signal $E_M$, $E_N$, reflected back to the antenna arrangement 11, is received and fed to the measuring device electronics 7. Through this frequency selectivity of the antenna arrangement 11 is created via the different wanted frequencies $f_m$, $f_n$ an unambiguous association of the successively transmitted microwave signals $S_M$, $S_N$ and their associated echo signals $E_M$, $E_N$ successively arriving in the measuring device electronics 7 for the associated signal path.

In the variant illustrated in FIG. 1, this is implemented by connecting after each receiving antenna 15, 17 a frequency-selective element $F_M$, $F_N$—especially a bandpass filter—in each case transmissive for one of the different wanted frequencies $f_m$, $f_n$. The bandpass filters serve to filter out from the received signals taken up with the respective receiving antenna 15, 17 the echo signal $E_M$, $E_N$ having the particular wanted frequency $f_m$, $f_n$.

In the example of an embodiment illustrated in FIG. 1, the microwave generator 9 successively produces two different microwave signals $S_M$, $S_N$, which are transmitted via the transmitting antenna 13. For the receipt of the associated echo signals $E_M$, $E_N$, two receiving antennas 15, 17 are correspondingly provided. From the received signal of the receiving antenna 15 there is filtered out via the frequency-selective element $F_M$ connected after the receiving antenna 15 the echo signal $E_M$ associated with the microwave signal $S_M$. Filtered from the received signal of the receiving antenna 17 via the frequency-selective element $F_M$ connected after the receiving antenna 17 is the echo signal $E_N$ associated with the microwave signal $S_N$.

On the basis of the different wanted frequencies of the echo signals $E_M$, $E_N$, the echo signals $E_M$, $E_N$ can be uniquely associated with the respective receiving antenna 15, 17. For this, the measuring device electronics 7 includes an apparatus 21, which, based on their different wanted frequencies $f_m$, $f_r$, associates the received echo signals $E_M$, $E_N$ with the respective receiving antennas 15, 17, or the respective signal paths extending through these receiving antenna 15, 17. To do this, apparatus 21 includes, connected to a signal processing system 23, for example, a memory, in which these associations are stored. Since the microwave generator 9 successively produces the different individual microwave signals $S_M$, $S_N$, and these are correspondingly successively transmitted, the wanted frequencies $f_m$, $f_n$ of the echo signals $E_M$, $E_N$ need not be measured. So long as the microwave generator 9 generates the microwave signal $S_M$, the receiving antennas 15, 17 exclusively receive its echo signal $E_M$. The associated echo signal $E_M$ reflected back to the antenna arrangement 11a by reflection in the container 3 is indeed received by both receiving antennas 15, 17; however, it can only pass through the frequency-selective element $F_M$ connected after the receiving antenna 15 and transmissive for the wanted frequency $f_m$.

So long as the microwave generator 9 generates the microwave signal $S_N$, the receiving antennas 15, 17 exclusively receive its echo signal $E_N$. The associated echo signal $E_N$ reflected back to the antenna arrangement 11a by reflection in the container 3 is indeed received by both receiving antennas 15, 17, however, it can only pass through the frequency-selective element $F_N$ connected after the receiving antenna 17 and designed for its wanted frequency $f_n$. For determining the fill level, the individual successively arriving echo signals $E_M$, $E_N$ are processed by the signal processing system 23, in that, for example, based on the echo signals $E_M$, $E_N$, an echo function is derived, which shows received signal amplitude as a function of signal travel time. For this, the methods known from the state of the art both for pulse radar fill level measuring devices as well as for FMCW radar fill level measuring device can be applied. The fill level measuring device of the invention has, in such case, the advantage, that the transmitted microwave signal $S_M$, $S_N$ relevant for the travel time determination of the respective echo signal $E_M$, $E_N$ is always available at the correct time in the measuring device electronics 7 to the signal processing system 23 via the microwave generator 9.

Via a corresponding increasing of the number of different microwave signals and the receiving antennas, three or more echo signals taken up by different receiving antennas can naturally also be distinguished.

In the case of the variant illustrated in FIG. 1, the measuring device electronics 7 is connected with the antenna arrangement 11 exclusively via the single waveguide 19. This is connected via a transmitter/receiver separator 25, e.g. an isolator, circulator or directional coupler, both to the transmitting antenna 13 as well as also to the receiving antennas 15, 17. Via waveguide 19, the antenna arrangement 11 is fed with the different microwave signals $S_M$, $S_N$. In the reverse direction, the echo signals $E_M$, $E_N$ filtered out from the received signals of the receiving antennas 15, 17 are transmitted via this microwave guide 19 from the antenna arrangement 11 to the measuring device electronics 7.

This offers the advantage that only a single connection is required between the measuring device electronics 7 and the antenna arrangement 11a. A further advantage lies in the fact that, in such case, a permanent connection is involved, which does not cause a change and/or degrading of the signal transmission.

Figure 2:
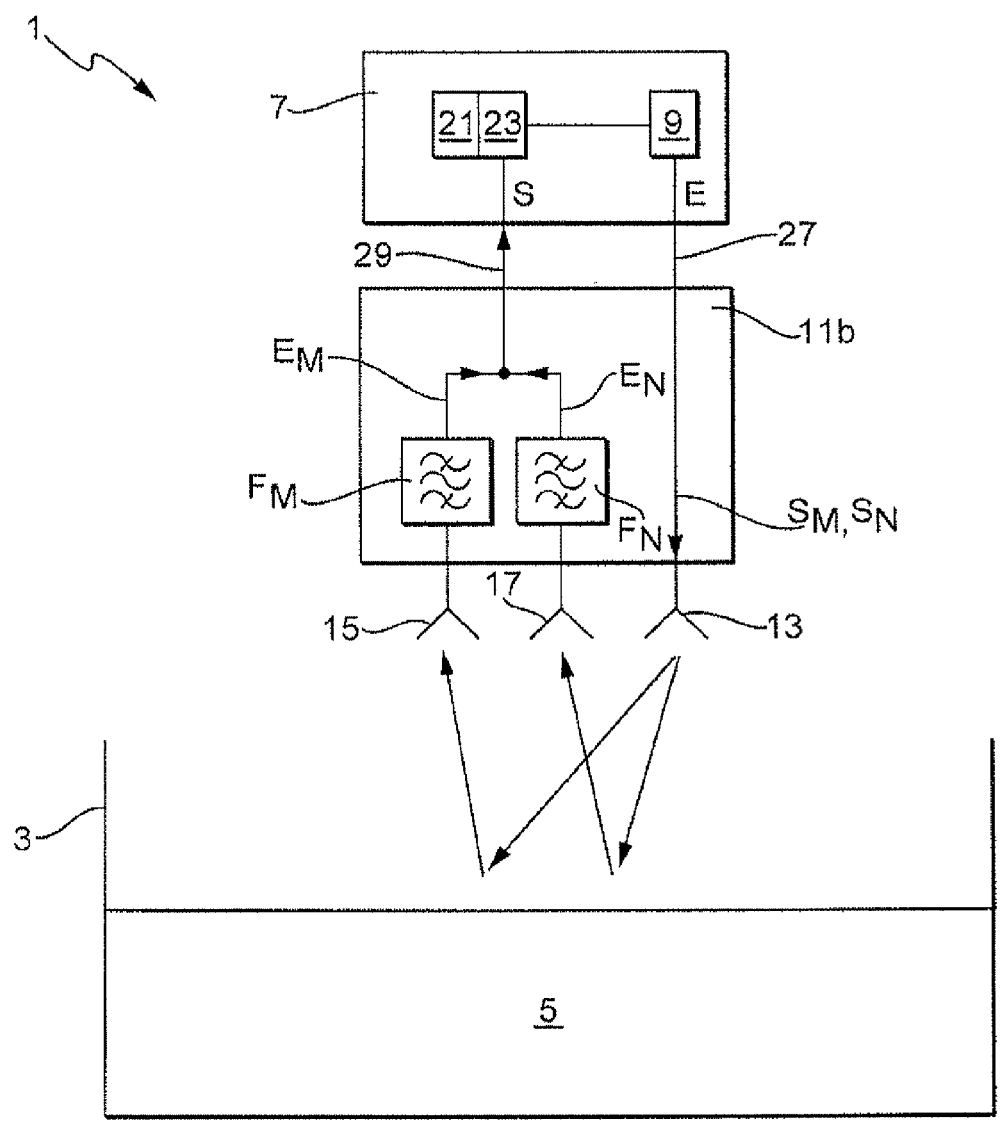
FIG. 2 is a fill level measuring device of the invention with measuring device electronics and, connected thereto via a transmission guide and a receiving guide, a frequency-selective antenna arrangement with a transmitting antenna and a plurality of receiving antennas.

FIG. 2 shows a second variant of the fill level measuring device of the invention. In contrast to the variant illustrated in FIG. 1, the measuring device electronics 7 is connected here with the antenna arrangement 11b via two microwave guides, namely a transmission guide 27 and a receiving guide 29. The transmission guide 27 leads from the microwave generator 9 of the measuring device electronics 7 to the transmitting antenna 13. Via it, the transmitting antenna 13 is fed with the microwave signals $S_M$, $S_N$. Via the receiving guide 29, the echo signals $E_M$, $E_N$ filtered out from the received signals of the receiving antennas 15, 17 are fed to the measuring device electronics 7. For this, all receiving antennas 15, 17 are connected to the second receiving guide 29, which, in turn, is connected with the measuring device electronics 7. The transmission guide 27 and the receiving guide 29 are here also permanent connections, which, in contrast to electronic switches, do not effect a change and/or degrading of the signal transmission. In contrast to the variant illustrated in FIG. 1, in the antenna arrangement 11b illustrated in FIG. 2, no transmitter/receiver separator 25 is required.

Figure 3:
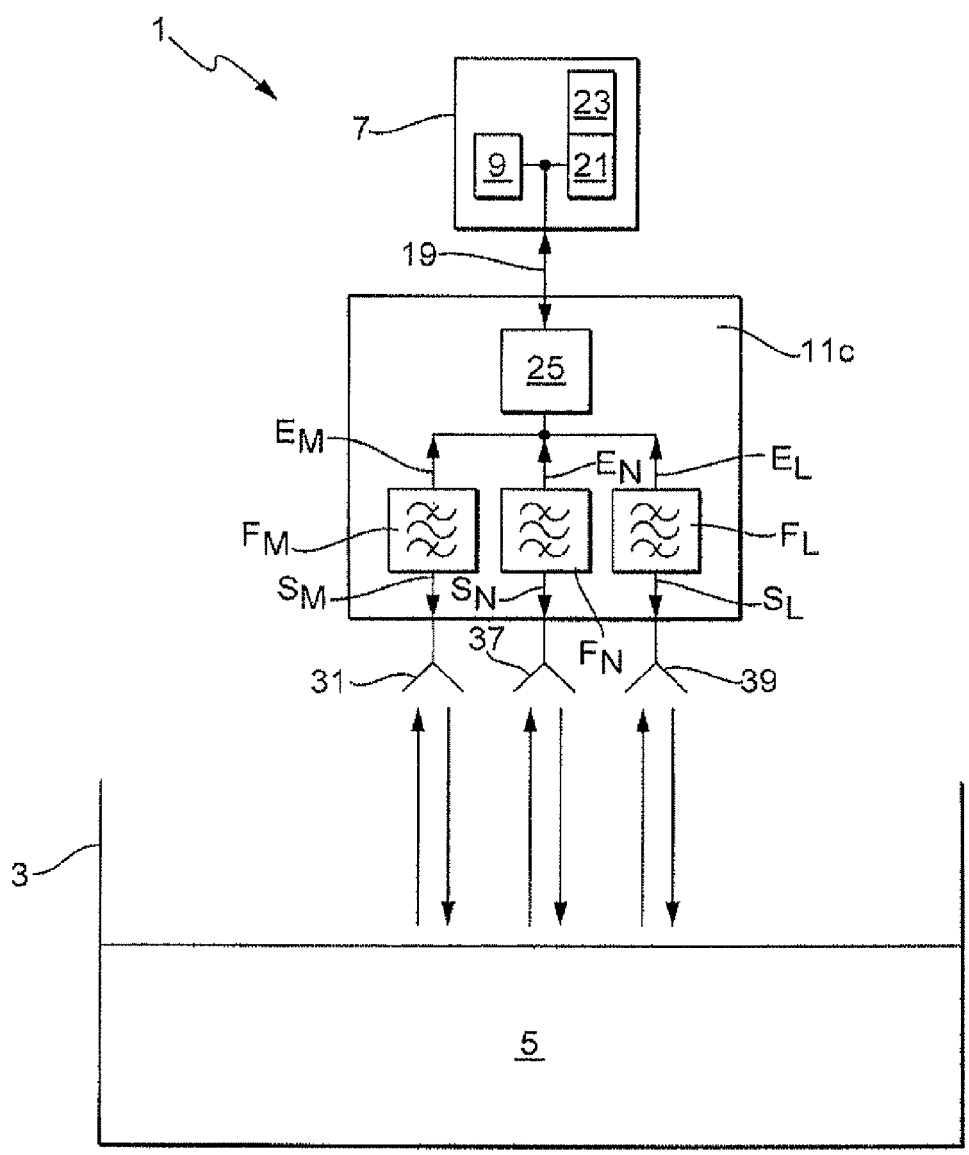
FIG. 3 is a fill level measuring device of the invention, wherein the antenna arrangement has a plurality of transmitting and receiving antennas.

FIG. 3 shows a third variant of the fill level measuring device of the invention, which has the measuring device electronics 7 already explained on the basis of FIGS. 1 and 2, and a frequency-selective, passive antenna arrangement 11c connected thereto. In contrast to the earlier described antenna arrangements 11a and 11b, the antenna arrangement 11c includes transmitting and receiving antennas 31, 33, 35; that is to say, each one of the antennas serves both as a transmitting antenna as well as a receiving antenna. Associated with each of these transmitting and receiving antennas 31, 33, 35 is, in each case, a frequency-selective element $F_M$, $F_N$, $F_L$ transmissive for one of the different wanted frequencies $f_m$, $f_n$, $f_l$, which, in each case, serves to filter out on the transmitter side from the different microwave signals $S_M$, $S_N$, $S_L$ successively generated by the microwave generator 9 and conveyed to the antenna arrangement 11c the microwave signal $S_M$, $S_N$, $S_L$ having the particular wanted frequency $f_m$, $f_n$, $f_l$; this signal is then, in each case, transmitted exclusively via the associated transmitting and receiving antenna 31, 33, or 35 into the container 3. In the reverse direction, the particular frequency-selective element $F_M$, $F_N$, $F_L$ serves to filter out from the received signal taken up by the respective transmitting and receiving antenna 31, 33, 35 the associated echo signal $E_M$; $E_N$; $E_L$ having this wanted frequency $f_m$, $f_n$, $f_l$. In the illustrated example of an embodiment, the microwave generator 9 produces three different microwave signals $S_M$; $S_N$; $S_L$. The frequency-selective elements $F_M$, $F_N$, $F_L$ effect that the microwave signal $S_M$ is transmitted exclusively via the transmitting and receiving antenna 31, and that exclusively the associated echo signal $E_M$ is filtered out from its received signal and transmitted to the measuring device electronics 7. Correspondingly, the microwave signal $S_N$ is exclusively transmitted via the transmitting and receiving antenna 33, and from its received signal, exclusively the associated echo signal $E_N$ is filtered out and transmitted to the measuring device electronics 7. Likewise, the microwave signal $S_L$ exclusively is transmitted via the transmitting and receiving antenna 35, and from its received signal, exclusively the associated echo signal $E_L$ is filtered out and transmitted to the measuring device electronics 7.

Analogously to the example of an embodiment illustrated in FIG. 1, the antenna arrangement 11c is also connected with the measuring device electronics 7 exclusively via the single microwave guide 19, via which the antenna arrangement 11c is fed with the microwave signals $S_M$; $S_N$; $S_L$, and via which the associated echo signals $E_M$, $E_N$, $E_L$ filtered out from the received signals of the transmitting and receiving antennas 31, 33, 35 are fed to the measuring device electronics 7.

In the antenna arrangement 11c, the microwave guide 19 is connected via the transmitting- and receiver separator 25 parallelly to the three frequency-selective elements $F_M$; $F_N$; $F_L$, which, in turn, are connected to the transmitting and receiving antenna 31, 33, 35 associated with the respective element $F_M$; $F_N$; $F_L$.

Figure 4:
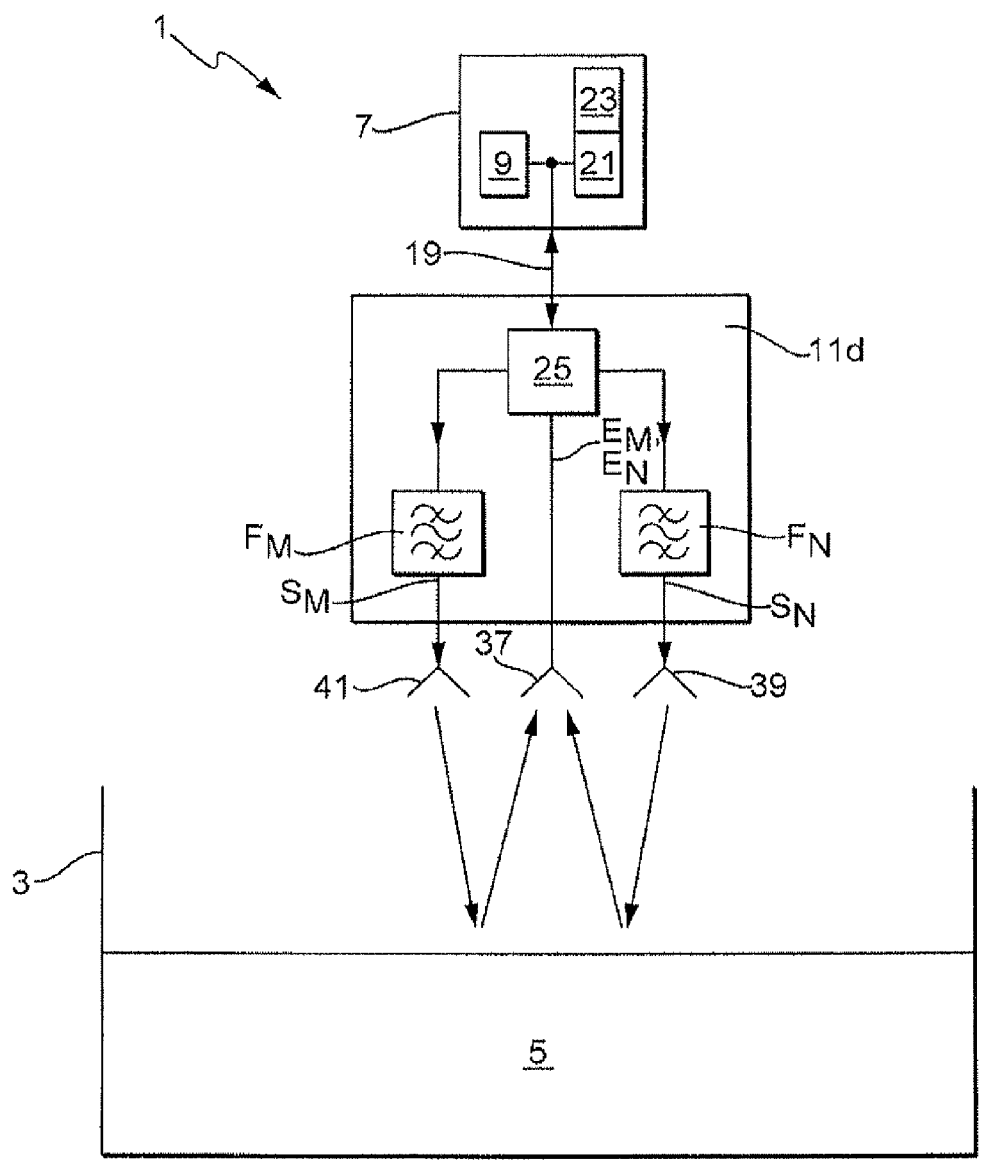
FIG. 4 is a fill level measuring device of the invention with measuring device electronics and, connected thereto via a single microwave guide, a frequency-selective antenna arrangement with a receiving antenna and a plurality of transmission antennas.
Figure 5:
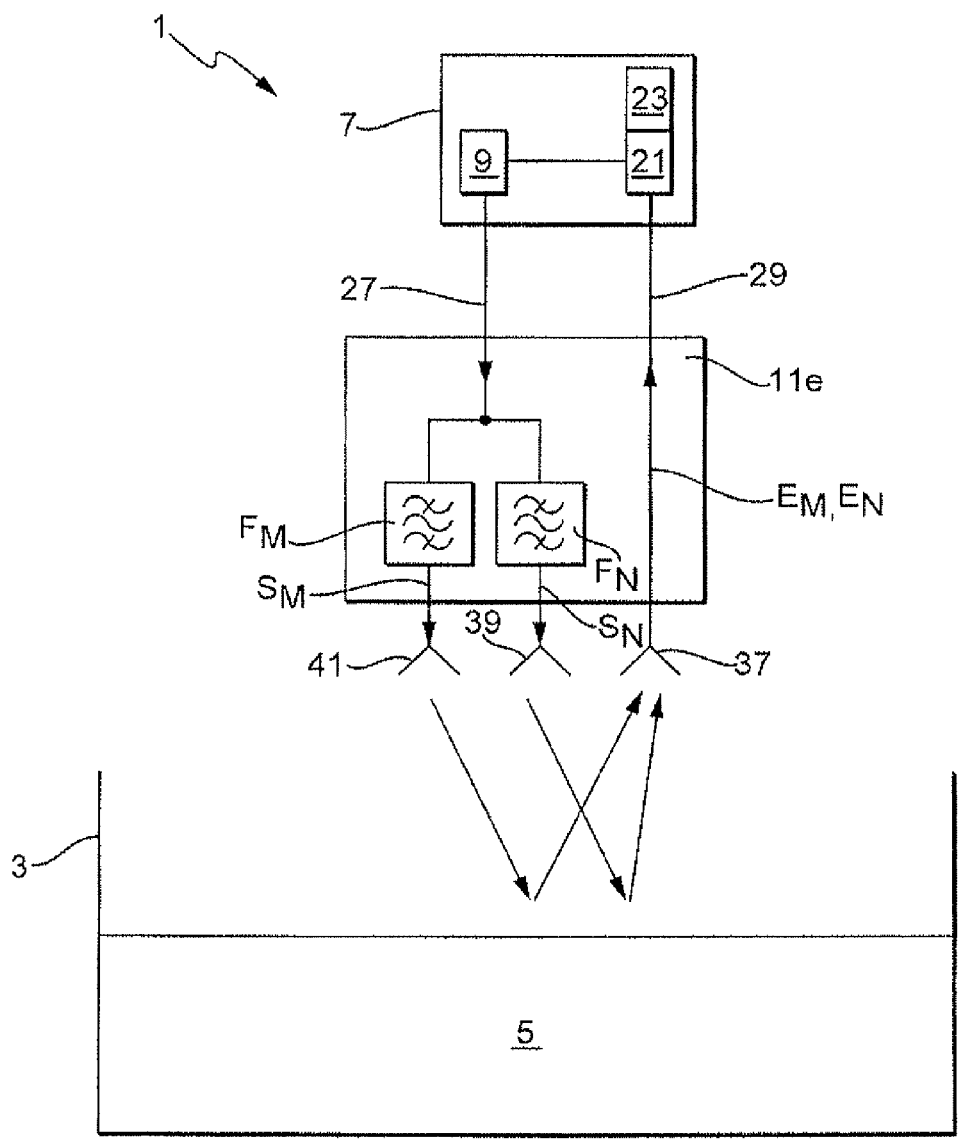
FIG. 5 is a fill level measuring device of the invention with measuring device electronics and, connected thereto via a transmission guide and a receiving guide, a frequency-selective antenna arrangement having a receiving antenna and a plurality of transmission antennas.

FIGS. 4 and 5 show two other fill level measuring devices of the invention, which in each case have a frequency-selective antenna arrangement 11d, 11e connected to the measuring device electronics 7. In contrast to the earlier described examples of embodiments, these antenna arrangements 11d, 11e have only one receiving antenna 37 and a plurality of transmission antennas 39, 41. Each of the transmission antennas 39, 41 serves, in each case, to transmit one of the different microwave signals $S_M$, $S_N$ into the container 3, and the receiving antenna 37 serves to receive the echo signals $E_M$, $E_N$ of the different microwave signals $S_M$ $S_N$ reflected back to the antenna arrangement lid, 11e by reflections in the container 3. For this, connected in front of each transmitting antenna 39, 41 is a frequency-selective element $F_M$, $F_N$—especially a bandpass filter—transmissive for one of the different wanted frequencies $f_m$, $f_n$, which serves to filter out from the microwave signals $S_M$, $S_N$ produced by the microwave generator 9 that signal, which, in the measurement operation, is transmitted via the particular transmitting antenna 39, 41.

For this, the measuring device electronics 7 can either, as shown in FIG. 4, be connected to the antenna arrangement 11d via a single microwave guide 19, via which the antenna arrangement 11d is fed with the different microwave signals $S_M$, $S_N$, and via which the associated echo signals $E_M$, $E_N$ taken up with the antenna arrangement 11d are fed to the measuring device electronics 7. In this case, the microwave guide 19 is, analogously to the example illustrated in FIG. 1, connected via the transmitter/receiver separator 25 to the transmission antennas 39, 41 and to the receiving antenna 37. In this case, frequency-selective elements $F_M$, $F_N$ are, in each case, arranged between the transmitter/receiver separator 25 and the respective transmitting antenna 39, 41.

Alternatively, the measuring device electronics 7 can, analogously to the example of an embodiment illustrated in FIG. 2, be connected to the antenna arrangement 11e via a transmission guide 27 and a receiving guide 29. This variant is shown in FIG. 5. In the antenna arrangement 11e, the transmission guide 27 is connected here via the frequency-selective element $F_M$ to the transmitting antenna 41, and connected via the frequency-selective element $F_N$ to the transmitting antenna 39. Due to the frequency-selective element $F_M$, $F_N$ connected in front of it, the transmitting antenna 41 transmits exclusively the microwave signal $S_M$, and the transmitting antenna 39 exclusively the microwave signal $S_N$. Since the microwave generator 9 successively generates the different microwave signals $S_M$, $S_N$, either one or the other transmitting antenna 39, 41 transmits. On the basis of the frequency $f_m$, $f_n$ of the particular currently produced microwave signal $S_M$, $S_N$, and/or on the basis of the frequency $f_m$, $f_n$ of the currently received echo signal $E_M$, $E_N$ there is therewith necessarily yielded the association to that transmitting antenna 39, 41 via which the transmission occurred.

The particular currently transmitted microwave signal $S_M$, $S_N$, $S_L$ and the associated echo signal $E_M$, $E_N$, $E_L$ are, in each case, available in the measuring device electronics 7 offset pairwise in time to one another by the associated fill level dependent travel time, so that the measurement results successively gained via the different signal paths predetermined by the particular antenna arrangement, especially the associated echo functions dependent on the signal travel time, can be successively ascertained by one and the same signal processing system 23.

With the fill level measuring device of the inventions, a variety of different measuring methods can be performed. In such case, the different signal paths on which the microwave signals $S_M$, $S_N$, $S_L$ are transmitted and the associated echo signals $E_M$, $E_N$, $E_L$ are received are predeterminable, within broad limits, by the positioning of the individual antennas of the antenna arrangements 11a, 11b, 11c, 11d, 11e, their orientation, and their use as transmitting antennas, as receiving antennas or as transmitting and receiving antennas. In FIGS. 1 to 5, the individual signal paths predetermined by the particular antenna arrangement 11a, 11b, 11c, lid, 11e via the frequency-selective elements $F_M$, $F_N$, $F_L$ are represented by arrows.

For performing the previously described multipoint measurement, the antennas of the particular antenna arrangement 11a, 11b, 11c, 11d, 11e, can, for example, in each case, be arranged next to one another in a row. In the case of the example of an embodiment illustrated in FIG. 3, there is thereby in each case obtained via each of the individual transmitting and receiving antennas 31, 33, 35 in the case of a parallel orientation of the individual transmitting and receiving antennas 31, 33, 35 to the fill substance 5 the current fill level at the location of the particular transmitting and receiving antenna 31, 33, 35.

In the case of the other examples of embodiments, there are yielded the measurement locations at which, in the context of a multipoint measurement, fill levels are measured via the drawn signal paths, which, in each case, lead from one of the transmission antennas 13, 39, 41 to one of the receiving antennas 15, 17, 37. In such case, there are preferably selected antenna arrangements, such as, for example, the arrangement 11b of FIG. 2, in the case of which a number of receiving antennas 15, 17 are arranged in a group spatially neighboring one another, and a transmitting antenna 13 is arranged spatially outside the group, or antenna arrangements are selected, such as, for example, the arrangements lid, 11e, in the case of which a number of transmission antennas 39, 41 are arranged in a group spatially neighboring one another, and a receiving antenna 31 is arranged outside the group. The individual antennas are preferably oriented as a function of their position to one another in such a manner, that the signal yield on the individual signal paths is at a maximum.

For performing the previously described multilobe measurement, preferably, antenna arrangements, such as the antenna arrangement 11a of FIG. 1, are selected, in the case of which a number of receiving antennas 15, 17 spatially surround a single transmitting antenna 13. For this, the transmitting antenna 13 positioned in the center of the antenna arrangement 11a is preferably directly pointed at the fill substance 5 in the container, and the receiving antennas 15, 17 have, in each case, an orientation inclined relative to the orientation of the transmitting antenna 13, this orientation being selected in such a manner, that the receiving regions predetermined by the orientation of the receiving antennas 15, 17 covered by the respective receiving antenna 15, 17 at least partially cover the transmission region of the transmitting antenna 13, and the receiving regions of the individual receiving antennas 15, 17 partially overlap.

Analogously, an antenna arrangement 11e inverse to this with respect to the signal paths, as shown in FIG. 4, is naturally also applicable, in the case of which the receiving antenna 37 positioned in the center of the antenna arrangement 11d is spatially surrounded by a plurality of transmission antennas 39, 41. In this case, the receiving antenna 37 is preferably pointed directly at the fill substance 5, and the transmission antennas 39, 41 have, in each case, an orientation inclined relative to the orientation of the receiving antenna 37, such orientation being selected in such a manner, that the transmission regions of the transmission antennas 39, 41 predetermined by the orientations of the transmission antennas 39, 41 partially overlap, and at least partially lie in the receiving region of the receiving antenna 37.

The invention claimed is:

1. A fill level measuring device working with microwaves according to the travel time principle for fill level measurement of fill substances located in containers, comprising:
   a measuring device electronics having a microwave generator for successive production of microwave signals having different wanted frequencies;
   a frequency-selective, passive antenna arrangement connected thereto, which has a plurality of antennas, which serve to successively transmit the different microwave signals into the container, and to receive their echo signals reflected back to said antenna arrangement, which has a plurality of frequency-selective elements, especially bandpass filters, in each case transmissive for one of the different wanted frequencies, and in which, via said antennas and said frequency-selective elements, for each of the different microwave signals and its echo signal, a uniquely associated signal path is specified, via which such microwave signal is transmitted into the container, and
   its echo signal, reflected back to the antenna arrangement, is received and fed to said measuring device electronics; and
   an apparatus, which is provided in said measuring device electronics and which associates successively arriving echo signals with the associated signal path.

2. The fill level measuring device as claimed in claim 1, wherein:
   one of said antennas is a transmitting antenna, which serves to transmit the different microwave signals into the container;
   the remaining antennas are receiving antennas, which serve to receive the echo signals of the different microwave signals reflected back to said antenna arrangement by reflections in the container;
   in said antenna arrangement, after each receiving antenna, a frequency-selective element is connected, especially a bandpass filter, transmissive for one of the different wanted frequencies, this element serving to filter out from the received signal taken up by said particular receiving antenna the echo signal having such wanted frequency; and
   said apparatus associates the successive echo signals transmitted from said antenna arrangement to said measuring device electronics with said receiving antennas, from which they were received.

3. The fill level measuring device as claimed in claim 1, wherein:
   one of said antennas is a receiving antenna 1, which serves to receive the echo signals of the different microwave signals reflected back to said antenna arrangement by reflections in the container;
   the remaining antennas are transmission antennas, which serve, in each case, to transmit one of the different microwave signals into the container;
   in the antenna arrangement, placed in front of each transmitting antenna is a frequency-selective element, especially a bandpass filter, transmissive for one of the different wanted frequencies, which serves to filter out from the microwave signals produced by said microwave generator that signal, which, in measurement operation, is transmitted via the particular transmitting antenna; and
   said apparatus associates the successive echo signals transmitted from said antenna arrangement to said measuring device electronics with said transmitting antennas, from which the associated microwave signals were transmitted.

4. The fill level measuring device as claimed in claim 1, wherein:
   said antennas are transmitting and receiving antennas, which serve to transmit the different microwave signals into the container, and to receive their echo signals reflected back to said antenna arrangement by reflections in the container;
   in said antenna arrangement, associated with each transmitting and receiving antenna is a frequency-selective element, especially a bandpass filter, transmissive for one of the different wanted frequencies, and serving to filter out from the microwave signals produced by said microwave generator and conveyed to said antenna arrangement, and to convey to said transmitting and receiving antenna, that signal, which is transmitted via such transmitting and receiving antenna; and serving to filter out from the received signal taken up by such transmitting and receiving antenna the associated echo signal having such wanted frequency; and
   said apparatus associates the successive echo signals transmitted from said antenna arrangement to said measuring device electronics with said transmitting and receiving antenna, via which the associated microwave signal was transmitted and its echo signal received.

5. The fill level measuring device as claimed in claim 2, wherein:
   said measuring device electronics is connected with said antenna arrangement exclusively via a single waveguide;

via which the different microwave signals are transmitted from said measuring device electronics to said antenna arrangement, and the echo signals are transmitted from said antenna arrangement to said measuring device electronics; and via which is connected a transmitter/receiver separator provided in said antenna arrangement to all of said transmission antennas and to all of said receiving antennas.

6. The fill level measuring device as claimed in claim 2, wherein:

said measuring device electronics is connected with said antenna arrangement via a transmission waveguide, via which the transmission antennas are fed with the different microwave signals; and said measuring device electronics is connected with said antenna arrangement via a receiving wave guide, via which the echo signals are transferred from said antenna arrangement to said measuring device electronics.

7. The fill level measuring device as claimed in claim 2, wherein:

said receiving antennas are arranged in a group spatially neighboring one another; and said transmitting antenna is arranged spatially outside the group.

8. The fill level measuring device as claimed in claim 3, wherein:

said transmission antennas are arranged in a group spatially neighboring one another; and said receiving antenna is arranged spatially outside the group.

9. The fill level measuring device as claimed in claim 2, wherein:

said receiving antennas spatially surround said transmitting antenna;

said transmitting antenna is pointed toward the fill substance in the container, said receiving antennas have, in each case, an orientation inclined relative to the orientation of said transmitting antenna; and the receiving regions of the individual receiving antennas covered by the respective receiving antenna and predetermined by the orientation of the receiving antennas overlap partially.

10. The fill level measuring device as claimed in claim 3, wherein:

said transmission antennas spatially surround said receiving antenna;

said receiving antenna is pointed toward the fill substance in the container;

said transmission antennas have, in each case, an orientation inclined relative to the orientation of said receiving antenna; and the transmission regions of the individual transmission antennas predetermined by the orientations of the transmission antennas lie at least partially in the receiving region of the receiving antenna and overlap partially.

* * * * *